United States Patent
Patterson

[11] 3,891,921
[45] June 24, 1975

[54] LIQUID DAMPED GALVANOMETER

[75] Inventor: Irvin L. Patterson, Tulsa, Okla.

[73] Assignee: Telex Computer Products, Inc., Tulsa, Okla.

[22] Filed: Jan. 31, 1974

[21] Appl. No.: 438,478

[52] U.S. Cl. ................................. 324/125; 324/97
[51] Int. Cl. .......................... G01r 1/14; G01r 13/38
[58] Field of Search ................. 324/125, 97; 73/430

[56] References Cited
UNITED STATES PATENTS

| | | | |
|---|---|---|---|
| 2,596,019 | 5/1952 | Fisher | 324/125 |
| 3,439,273 | 4/1969 | Sills | 324/125 |

*Primary Examiner*—Alfred E. Smith
*Assistant Examiner*—Ernest F. Karlsen

[57] ABSTRACT

This disclosure describes an improved high frequency liquid damped galvanometer. It differs from conventional galvanometers in that the damping tube that confines the damping liquid is of larger diameter and of greater length so that the major portion of the galvanometer coil is emersed in the damping liquid and there is restricted clearance between the coil and the damping liquid tube. Because of the proximity between the mirror and the liquid surface, means are provided for restricting the migration of the damping liquid up the coil to the mirror surface, by coating the internal surface of the top portion of the damping tube and the top portion of the coil with a fluorinated resin. This coating is not wetted by the oily damping liquid so that there is no creeping of liquid up to the mirror, which is mounted above the tube by attachment to the top spool of the coil.

Another improvement of this invention lies in the adhesive material by which the mirror is attached to the top spool. The adhesive is of a special composition in which the epoxy adhesive is mixed with at least twice its weight of inert non-hygroscopic powder. When this mixture hardens there is much less shrinkage then is found in the epoxy cement alone, and there is therefore less distorting force on the mirror, which more nearly maintains its true planar surface.

9 Claims, 3 Drawing Figures

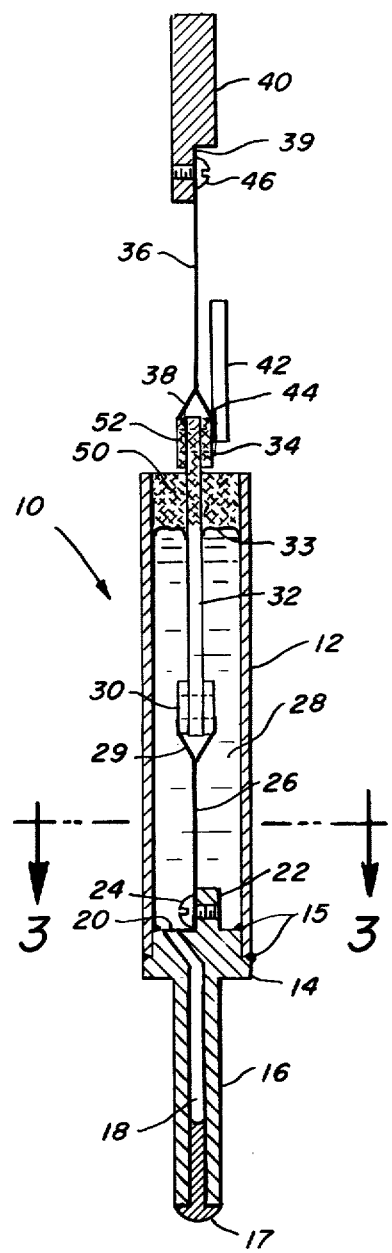
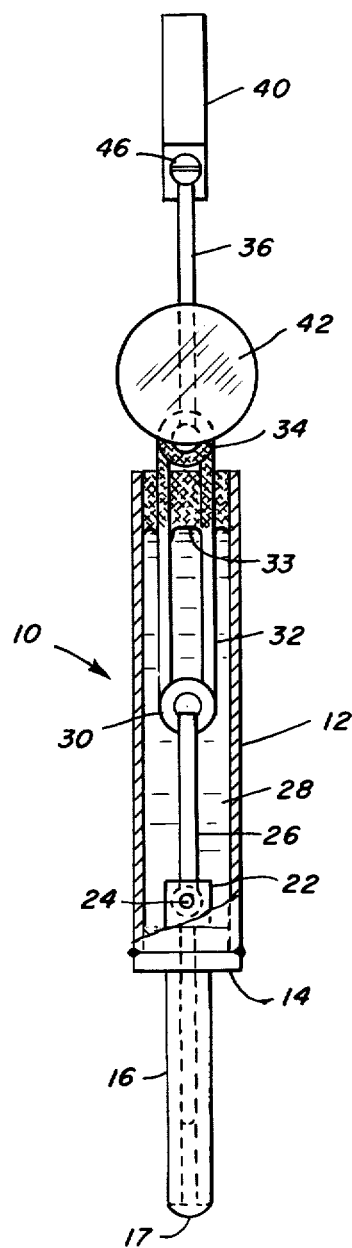
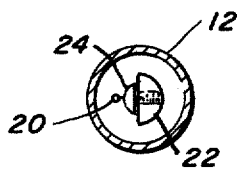
FIG. 1  FIG. 2
FIG. 3

LIQUID DAMPED GALVANOMETER

BACKGROUND OF THE INVENTION

This invention is in the field of electrical galvanometers. More particularly, it is in the field of high frequency liquid-damped galvanometers. Still more particularly, it is concerned with a high frequency, high damping, electrical galvanometer in which both the lower suspension and the galvanometer coil are emersed in the damping liquid.

In the prior art the damping liquid tube was of small diameter, just sufficiently large to enclose the lower suspension with a nominal clearance, and the damping liquid was held in that tube by capillary action. Because of the small surface area and minute movements of the suspension ribbon, the amount of damping that could be provided was minimal, and insufficient for high frequency galvanometers that required a sizable mirror.

In the prior art galvanometers the mirrors were generally mounted to the top spool of the coil by means of an epoxy cement, which would very often shrink sufficiently, in its hardening process, to distort the mirror, so that it no longer provided a truly plain reflecting surface.

SUMMARY OF THE INVENTION

It is a primary object of this invention to provide a high frequency liquid-damped galvanometer that has flat characteristics from a low frequency to at least 350 Hz. It is a further object of this invention to provide a liquid-damped galvanometer in which greater damping action is provided by emersing the major portion of the coil within the damping liquid. It is a still further object of this invention to provide means by coating the internal surface of the damping liquid tube near its top and also coating the top portion of the coil, with a fluorinated resin composition which is not wet by the oily damping liquid, so that migration of the liquid up the cylinder wall and up the coil to the mirror is prevented.

These and other objects are realized and the limitations of the prior art are overcome in this invention by mounting the coil, with an upper and a lower suspension ribbon, to studs, which are concentric with the axis of the suspension ribbons and the coil. A damping liquid retaining tube or damping tube is mounted on the bottom stud so as to retain the damping liquid with which the damping tube is partially filled. The lower stud has a small diameter drilled hole through which the damping liquid is inserted into the damping tube. The liquid is held in the tube by a gas tight plug of solder metal which is applied in a liquid form, and which flows into the hole by capillarity.

The upper portion of the inside wall of the tube and the surface of the upper portion of the coil and top spool of the galvanometer are coated with a fluorinated resin composition. The purpose of this coating is to prevent the migration of the oily damping liquid up the surface of the damping tube and up the coil. In prior art devices this migration was the cause of coating of the galvanometer mirror by the damping liquid with a consequent deleterious effect on the reflection surface.

The galvanometer mirror is attached to the top spool of the galvanometer coil. The attachment means comprises a mixture of an epoxy cement and an inert, non-hygroscopic powder, such as powdered aluminum glass, mica, etc., which is used as a filler material to reduce the amount of shrinkage displayed during the curing and hardening of the epoxy. Shrinkage, which is common in prior art devices, can be reduced to a negligible amount when the ratio of filler to epoxy is at least 2 to 1 by weight.

BRIEF DESCRIPTION OF THE DRAWINGS

These and other objects and advantages of this invention and a better understanding of the principles and details of the invention will be evident from the following description taken in conjunction with the appended drawings in which:

FIGS. 1 and 2 show vertical cross sectional views of the improved galvanometer of this invention taken respectively parallel to and perpendicular to the plane of the galvanometer coil.

FIG. 3 is a transverse cross section of the view of FIG. 1.

DESCRIPTION OF THE PREFERRED EMBODIMENT

Referring now to the drawings, the improved galvanometer of this invention is indicated generally by the numeral 10. It comprises a lower stud 16 with a flange portion 14 which supports a tubular portion 12. The tubular portion is attached to the flange by epoxy resin as indicated by the numeral 15. There is a stud mounting means 22 having a flat surface at the axis of the stud 16 with a tapped hole supporting a screw 24 by means of which the lower suspension ribbon 26 is attached to the lower stud. The lower suspension ribbon 26 is mounted in a plane passing through the axis of the stud 16.

The coil 32 is constructed in conventional manner by a plurality of turns of wire wound around two spaced spools 30 and 34, of nonconducting material. The lower suspension 26 is looped through the lower spool and indicated by numeral 29. The upper suspension 36 is likewise looped through the upper spool as indicated by numeral 38, and the top end of the upper suspension 36 is fastened by screw means 46 into a flat portion of the upper stud 40, which flat portion 39 passes through the axis of the top stud. The top stud 40 and the lower stud 16 are coaxial so that the entire galvanometer is mounted in a true linear manner. A mirror 42 is mounted to the top spool by means of a special adhesive 44 which will be described later.

Damping liquid 28 is inserted into the inside of the damping tube 12 through a small drilled hole 18 and 20, along the axis of the lower stud 16. The diameter of the hole 18 is small enough so that the damping liquid will flow up into the damping tube by capillarity. After the tube is filled the bottom end of the hole 18 is filled with solder metal alloy 17 which is applied in a molten state, and which is drawn up the tube by capillarity, and then allowed to solidify. The hardened solder provides a gas tight plug which prevents the damping liquid from running out of the tube even when it is inverted.

The damping liquid fills the internal volume of the tube 12 to a level indicated by numeral 33. The upper portion of the internal wall of the damping tube 12 is coated with a fluorinated resin composition, such as indicated by the marking 50. This is designed to coat the surface so that the damping liquid, which does not wet this material, will be prevented from migrating up the internal surface of the tube and over the edge. The upper portion of the coil 32 is also coated with this fluorinated resin material so as to prevent migration of the damping liquid up the coil and to the surface of the mirror 42. Any migration of the liquid to the mirror surface would obscure the light and by its refraction would cause a defocusing of the beam with unsatisfactory results. Therefore, the coating material is essential. The coating material is generally of the class of fluorinated resins. One such material known by the name NYE-BAR, type H, is manufactured by the William F. Nye Co., Inc., New Bedford, Mass.

In the prior art the damping tube has generally been of a shorter length and a much smaller diameter in which only the lower suspension 26 was emersed in the damping liquid. Therefore, a very limited amount of damping effort could be provided. In this embodiment practically the entire length of the coil is emersed in the damping liquid, so that a very large damping force can be provided, so as to maintain a flat response up to a very high frequency. Thus, the coating material of the coil and the damping tube are extremely important because, due to the large surface involved, there would be excessive migration of liquid were it able to wet the surfaces.

Another important feature of this invention lies in the method of attachment of the mirror to the coil. Normally, this is done by means of an epoxy cement that attaches the mirror to the top spool. However, since the mirrors must be small in size and thin in construction so as to provide a minimum moment of inertia, so that the natural frequency of the coil and suspension can be made very high, it is important that the cementing material not destroy the planar nature of the mirror surface. It has been found that in the prior art there is considerable shrinking of the epoxy resin. This results in the mirror surface being distorted from its planar condition with very unsatisfactory results.

It has been found that by adding to the epoxy cement a nonhygroscopic enert powder, such as aluminum powder for example, as a filler material, this will reduce the amount of shrinkage displayed during the curing and hardening of the adhesive. Tests show that the shrinkage can be reduced to a negligible amount when the ratio of inert filler to adhesive is greater than two to one by weight. By the use of this special adhesive it is possible to cement thin mirrors to the coil and to provide distortion of the flat surface of the mirror to less than ¼ wave length of 6328 Angstrom light.

In review, there are three principal innovations in the embodiment of this invention indicated in the drawing. One, the damping tube is made of larger diameter and greater length so that the lower suspension and the major portion of the coil are emersed in the damping liquid with the result that a much greater damping effect can be provided such as would be necessary for a high frequency galvanometer. Two, in order to prevent migration of the damping liquid up the inner surface of the damping tube and up the coil to the mirror, those parts are coated with a composition of fluorinated resin which has the property that it is not wet by the damping liquid and so the liquid will not migrate up these surfaces. Three, the attachment of the mirror to the coil is effected by a special cement which utilizes epoxy cement with an inert, nonhygroscopic filling material of fine powder, such as aluminum powder. At least two times the weight of filler is used with one weight of epoxy. By the use of this cement there is a very minimum of distortion of the flat surface of the mirror.

While the invention has been described with a certain degree of particularity it is not manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a liquid damped galvanometer having:
   a. a lower ribbon torsion spring fastened in a lower support rod;
   b. a coil supported between two spools, the lower ribbon torsion spring fastened to the lower spool;
   c. an upper ribbon torsion spring fastened at its lower end to the upper spool of said coil, and at its upper end to an upper support rod;
   d. mirror means mounted to said upper spool; the improvement comprising;
   e. damping liquid tubular means surrounding said lower torsion spring and said coil, and damping liquid in said tubular means; and
   f. means to mount said mirror to said upper spool comprising; an epoxy cement including an inert, non-hygroscopic filler material.

2. The galvanometer as in claim 1 in which said filler material is aluminum powder.

3. The galvanometer as in claim 1 in which the ratio of filler material to epoxy cement is at least in the ratio of 1½ to 1 by weight.

4. The galvanometer as in claim 1 in which the ratio of filler material to epoxy cement is 2 to 1 by weight.

5. The galvanometer as in claim 1 in which said filler material is powdered glass.

6. The galvanometer as in claim 1 in which said filler material is powdered mica.

7. The galvanometer as in claim 1 in which said lower ribbon torsion spring is mounted on said lower support rod on a support surface at the axis of said support rod.

8. The galvanometer as in claim 1 in which the upper inner lip of said tubular means and the upper portion of said coil are coated with a flourinated resin, whereby said coated areas are not wetted by said damping liquid.

9. The galvanometer as in claim 8 in which said fluorinated resin is of the class of NYEBAR - H.

* * * * *